United States Patent [19]
Li et al.

[11] Patent Number: 6,153,231
[45] Date of Patent: Nov. 28, 2000

[54] ENVIRONMENTALLY FRIENDLY CHEWING GUM BASES

[75] Inventors: Weisheng Li, Montclair; Charles P. Orfan, Howell, both of N.J.

[73] Assignee: Wm. Wrigley Jr. Company, Chicago, Ill.

[21] Appl. No.: 09/446,668

[22] PCT Filed: Jun. 25, 1997

[86] PCT No.: PCT/US97/11008

§ 371 Date: Dec. 21, 1999

§ 102(e) Date: Dec. 21, 1999

[87] PCT Pub. No.: WO98/58550

PCT Pub. Date: Dec. 30, 1998

[51] Int. Cl.[7] .................................................... A23G 3/30
[52] U.S. Cl. .................................................. 426/6; 426/3
[58] Field of Search .................................. 426/3, 4, 5, 6

[56] References Cited

U.S. PATENT DOCUMENTS

| | | | |
|---|---|---|---|
| 4,968,350 | 11/1990 | Bindschaedler et al. | 106/170 |
| 4,983,745 | 1/1991 | Muller et al. | 549/274 |
| 5,142,023 | 8/1992 | Gruber et al. | 528/354 |
| 5,258,488 | 11/1993 | Gruber et al. | 528/354 |
| 5,264,592 | 11/1993 | Fridman et al. | 549/274 |
| 5,288,502 | 2/1994 | McGinty et al. | 424/484 |
| 5,300,576 | 4/1994 | Nemphos et al. | 525/190 |
| 5,340,646 | 8/1994 | Morita et al. | 428/307.3 |
| 5,357,034 | 10/1994 | Fridman et al. | 528/354 |
| 5,357,035 | 10/1994 | Gruber et al. | 528/354 |
| 5,360,892 | 11/1994 | Bonsignore et al. | 528/354 |
| 5,366,740 | 11/1994 | Shaw et al. | 426/3 |
| 5,437,924 | 8/1995 | Decker, III et al. | 428/318.4 |
| 5,443,780 | 8/1995 | Matsumoto et al. | 264/290.2 |
| 5,444,107 | 8/1995 | Ajioka et al. | 523/124 |
| 5,470,944 | 11/1995 | Bonsignore | 528/354 |
| 5,482,722 | 1/1996 | Cook | 426/3 |
| 5,501,856 | 3/1996 | Ohtori et al. | 424/428 |
| 5,508,378 | 4/1996 | Ohara et al. | 528/354 |
| 5,520,923 | 5/1996 | Tjia et al. | 424/426 |
| 5,563,238 | 10/1996 | Bonsignore et al. | 528/354 |
| 5,580,590 | 12/1996 | Hartman | 426/3 |
| 5,672,367 | 9/1997 | Grijpma et al. | 426/6 |

FOREIGN PATENT DOCUMENTS

| | | |
|---|---|---|
| 0711506 A2 | 5/1996 | European Pat. Off. . |
| 7-0025352 | 3/1995 | Japan . |

OTHER PUBLICATIONS

*Chemical Marketing Reporter*, vol. 249, No. 22, p. 5.
"Synthesis and Evaluation of Biodegradable Block Copolymers of e–Caprolactone and D L–Lactide", *Journal of Polymer Science: Polymer Letters Ed.*, vol. 21, 1983, pp. 593–600.
"Synthesis of ABA Triblock Copolymers of e–Caprolactone and D L–Lactide", *Macromolecules*, vol. 17, 1984, pp. 2764–2767.
"Miscibility and Biodegradability of Blends of Poly(lactic acid) and Poly(vinyl acetate)", *Polymer*, vol. 37, No. 3, pp. 437–444.
R.S. Seeley, "Can Lactic Polymers Turn Sour to Sweet?", *Chemical Business*, Feb. 1992, pp. 28–30.
I. Arvanitoynnis, A. Nakayama, E. Psomiadou, N. Kawasaki, and N. Yamamoto, "Synthesis and Degradability of a Novel Aliphatic Polyester Based on L–Lactide and Sorbitol", *Polymer*, 37 (4), 1996), pp. 651–660.
Polylactic Acid Article Search Report, NERAC, Jul. 19, 1996.
Linko et al., "Producing High Molecular Weight Biodegradable Polyesters," *Chemtech*, Aug. 1996, pp. 25–31.

*Primary Examiner*—Arthur L. Corbin
*Attorney, Agent, or Firm*—Hill & Simpson

[57] ABSTRACT

Chewing gum bases, and resultant chewing gums, that are environmentally friendly are provided. The chewing gum base comprises approximately 3 to about 99% by weight poly(lactic acid) copolymers selected from the group consisting of poly(lactic acid-dimer-fatty acid-oxazoline) copolymers and poly(lactic acid-diol-urethane) copolymers.

24 Claims, 2 Drawing Sheets

ENVIRONMENTALLY FRIENDLY CHEWING GUM BASES

BACKGROUND OF THE INVENTION

The present invention relates generally to chewing gum compositions and methods for making same. More specifically, the present invention relates to chewing gum compositions that are more environmentally acceptable than typical compositions.

For hundreds of years, people have enjoyed chewing gum like substances. In the late 1800's, the predecessor to todays chewing gum compositions were developed. Today chewing gum is enjoyed daily by millions of people worldwide.

Chewed gum is usually disposed of in the wrapper that initially houses the chewing gum. Likewise, chewed gum can be disposed of in other substrates by wrapping the substrate around the chewed gum.

Although chewed gum can be easily disposed of without creating any problems, chewing gum when improperly disposed of can create environmental issues. In this regard, the improper disposal of chewing gum, e.g., expectorating the chewing gum on a sidewalk, floor, or like area can create a nuisance. Typically, these gum cuds are mainly composed of a water insoluble masticatory part which is represented by the gum base. Due to its formulation, these gum cuds have an adhesive like characteristic. Therefore, the chewed gum cuds can stick to surfaces on to which it is placed. This can create issues if the chewed gum cuds are improperly discarded.

SUMMARY OF THE INVENTION

The present invention provides a chewing gum base, and resultant chewing gum, that is environmentally friendly. As used herein the term "environmentally friendly" refers to a chewing gum composition that: will degrade; can be easily removed from indoor or outdoor surfaces; can be ingested after chewing; and/or will dissolve in the mouth after a period of chewing.

Pursuant to the present invention environmentally friendly gum bases are provided that include biodegradable copolymeric elastomers based on lactic acid.

To this end, the present invention provides, a chewing gum base comprising approximately 3 to about 99% by weight poly(lactic acid) copolymers selected from the group consisting of poly(lactic acid-dimer-fatty acid-oxazoline) copolymers and poly(lactic acid-diol-urethane) copolymers.

In an embodiment of the present invention, the copolymers are selected from the group consisting of lactic acid, dimeric acids and oxazolines, diols, and diisocyanates.

In an embodiment of the present invention, the poly (lactic acid) copolymers comprise approximately 20 to about 70% by weight of the chewing gum base.

In an embodiment of the present invention, the poly (lactic acid) copolymers comprise approximately 10 to about 99% by weight lactic acid.

In an embodiment of the present invention, the base includes at least one softener chosen from the group consisting of triglycerides of cottonseed oil, soybean oil, palm oil, palm kernel oil, coconut oil, safflower oil, tallow oil, cocoa butter oil, and medium chain triglycerides.

In an embodiment of the present invention, the softener is hydrogenated.

In an embodiment of the present invention, the softener is non-hydrogenated.

In an embodiment of the present invention, the base includes at least one softener chosen from the group consisting of hydrogenated soya oil, glycerol monostearate, capric triglyceride, and hydrogenated cotton seed oil.

In an embodiment of the present invention, the base has a melting temperature, as determined by DSC, of approximately 20 to about 80° C.

In another embodiment, the present invention provides a chewing gum base free of elastomers and vinyl polymers having a molecular weight greater than 2000. The base includes at least one poly(lactic acid) selected from the group consisting of poly(lactic acid-dimer-fatty acid-oxazoline) and poly(lactic acid-diol-urethane) copolymers. The gum base also includes a filler, a fat, and an emulsifier.

In an embodiment, the gum base includes a wax.

In an embodiment, the filler has a particle size of between approximately 3 to about 10 microns.

In yet another embodiment of the present invention, a chewing gum is provided. The chewing gum comprising a water soluble portion and a water insoluble base. The base includes at least one poly(lactic acid) selected from the group consisting of poly(lactic acid-dimer-fatty acid-oxazoline) copolymers and poly(lactic acid-diol-urethane) copolymers.

In an embodiment, the insoluble base does not include any elastomers or vinyl polymers having a molecular weight greater than 2000.

In an embodiment, the gum has a removability of greater than 9 in/kg and a peel force of less than 150 g/in.

In an embodiment, the gum has a removability of greater than 30 in/kg and a peel force of less than 50 g/in.

It is an advantage of the present invention to provide an environmentally friendly chewing gum base.

Still further, it is an advantage of the present invention to provide a chewing gum composition made from an environmentally friendly chewing gum base.

Another advantage of the present invention is to provide a degradable chewing gum containing an environmentally friendly chewing gum base.

Moreover, an advantage of the present invention is to provide a chewing gum composition that when chewed, if improperly discarded onto a surface, can be easily removed therefrom.

Additional features and advantages of the present invention are described in, and will be apparent from the detailed description of the presently preferred embodiments and from the drawings.

DETAILED DESCRIPTION OF THE PRESENTLY PREFERRED EMBODIMENTS

Figure 1:
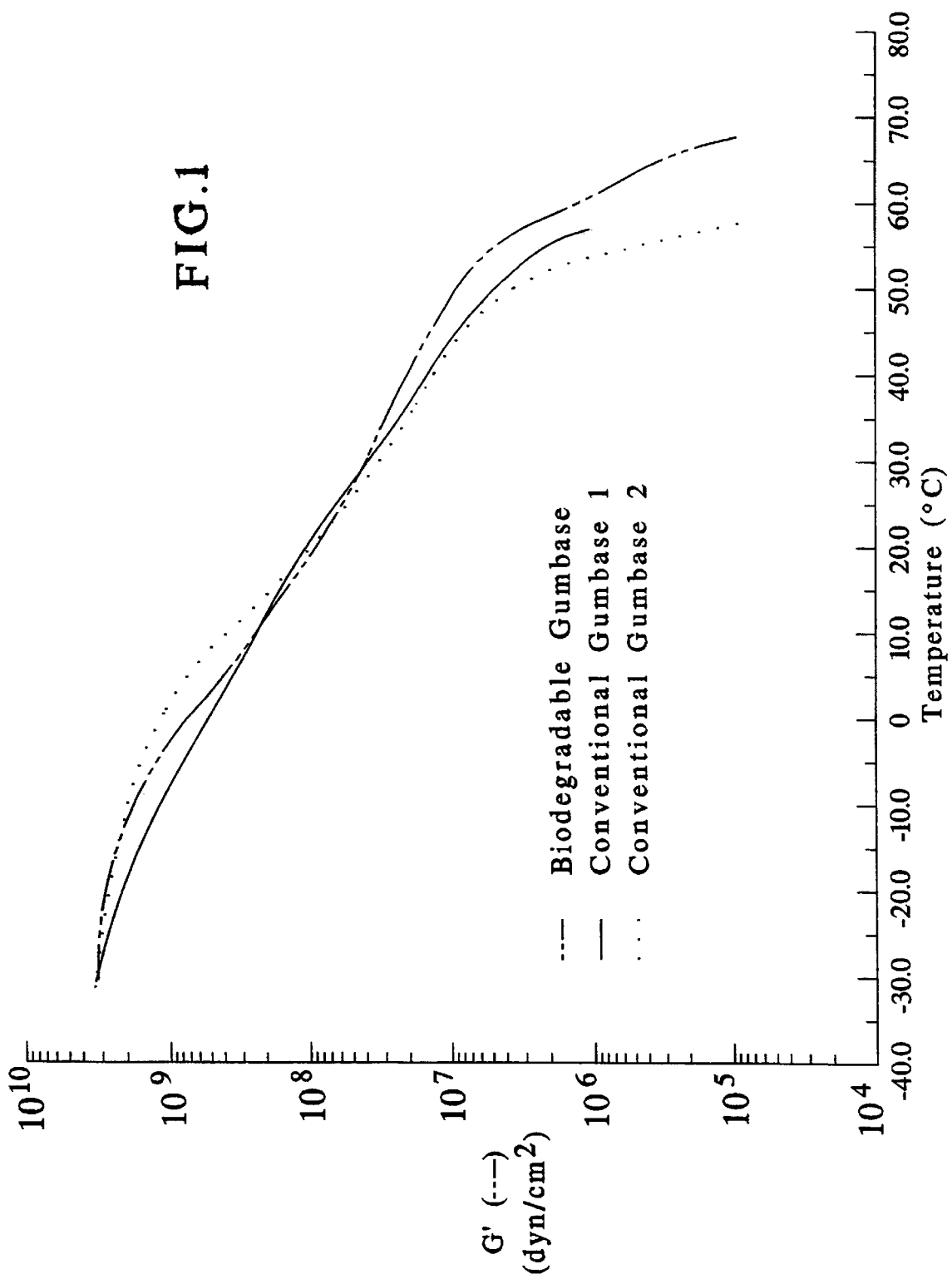
FIG. 1 illustrates the rheological properties of an embodiment of the composition of the present invention set forth in Example 1, compared with two typical, butyl rubber based gum bases.

The present invention provides an improved chewing gum base. Specifically, the present invention provides a chewing gum base that is environmentally friendly. In this regard, the chewing gum base includes a biodegradable elastomer.

Additionally, improved chewing gums as well as ingredients used for chewing gum bases are described.

The chewing gum base contains a biodegradable poly (lactic acid) elastomer. It is has been surprisingly found that gum bases formed with such a poly(lactic acid) elastomer are biodegradable. Not only are they readily biodegradable but additionally the gum cuds do not stick on common surfaces such as sidewalks, floors, cloth, carpeting, and like surfaces when improperly disposed. Additionally, the chewing gum made from such gum bases possess similar characteristics to conventional chewing gum.

Lactic acid is a bifunctional non-toxic monomer. It can be extracted from plants, obtained through fermentation of starch, sugar, or cheese, or by chemical synthesis. Its homopolymer has been proven to be completely and rapidly biodegradable.

Pure poly(lactic acid) however, is highly crystalline and lacks desired elasticity. It therefore does not offer the desirable chewing characteristics required by chewing gums. By copolymerizing lactic acid with other monomers, one can produce copolymers with desirable elasticity.

The present invention can be used to construct a variety of chewing gums. In general, a chewing gum composition typically comprises a water-soluble bulk portion, a water-insoluble chewable gum base portion and flavoring agents. The water-soluble portion dissipates with a portion of the flavoring agent over a period of time during chewing. The gum base portion is retained in the mouth throughout the chew. The term chewing gum refers to both a chewing and bubble gum type gum in its general sense.

The insoluble portion of the gum, usually referred to as the gum cud, typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure and how it may be compounded with other ingredients. In the gum base and gum of the present invention the lactic acid copolymers provide rubbery, cohesive nature.

Other optional ingredients such as antioxidants may also be used in the gum base.

Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), beta-carotenes, tocopherols, acidulants such as Vitamin C, propyl gallate, other synthetic and natural types of mixtures thereof.

Preferably, the antioxidants used in the gum base are butylated hydroxyanisole (BHA), butylated hydroxytoluene (BHT), tocopherols, or mixtures thereof.

Petroleum waxes aid in the curing of the gum made from the gum base as well as improve shelf-life and texture. Wax crystal size when hard also improves the release of flavor. Those waxes high in iso-alkanes have a small crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes.

The gum base and gum of the present invention may optionally employ petroleum waxes containing little if any normal-alkanes, or straight-chained alkanes as they may be called, and contain predominantly iso-alkanes, or branched chain alkanes, having carbon chain lengths greater than about 30. Formulation of some gum bases of this type may result in these gum bases being more homogenous and that have ingredients exhibiting more compatibility with each other. Again, this compatibility is the result of the branched nature of iso-alkanes physically interacting, on a molecular level, with the branched nature of the other gum base ingredients.

As just mentioned, the optional waxes are those of at least 10 $mm^2/s$ viscosity, greater than 600 average molecular weight and containing predominantly iso-alkanes, or randomly branched alkanes as they may be called, of carbon lengths greater than 30. Those waxes not preferred are those of less than 10 $mm^2/s$ viscosity, less than 600 average molecular weight, containing predominantly normal-alkanes of carbon lengths less than and greater than 30 and some terminally branched iso-alkanes. Most preferred gum bases and gums that are free of wax. Synthetic waxes are produced by means atypical of petroleum wax production and thus are not considered petroleum wax. These synthetic waxes may be used in accordance with the present invention and may be included optionally in the gum base and gum.

The synthetic waxes may include waxes containing branched alkanes and copolymerized with monomers such as but not limited to propylene and polyethylene and Fischer-Tropsch type waxes. Polyethylene wax is not in the same category as polyethylene, a polymer of ethylene monomers. Rather, polyethylene wax is a synthetic wax containing alkane units of varying lengths having attached thereto ethylene monomers.

Preferably, the gum and gum base is free of petroleum waxes.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wishes to provide more elastomeric chain exposure to the alkanic chains of the waxes.

Elastomer plasticizers optionally suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene and mixtures thereof.

Most preferably, the gum and gum base is free of elastomer plasticizer, which may tend to increase gum cud tack to surfaces.

The elastomer plasticizers used may be of one type or of combinations of more than one. Typically, the ratios of one to the other are dependent on each respective softening point, on each effect on flavor release, and on each respective degree of tack they cause to the gum. Ball and ring softening points of the rosin ester types described above may range from about 45 to about 120° C. Softening points of the terpene resins may range from about 60 to about 130° C.

Occasionally, both terpene and rosin ester resins may be used in the present invention. The terpene rosin ester ratios may range from about 1:15 to about 15:1.

Softeners modify the texture, cause the hydrophobic and hydrophilic components of the base to be miscible, and may further plasticize the synthetic elastomers of the gum base. Softeners suitable for use in the gum base and gum of the present invention include triglycerides of non-hydrogenated, partially hydrogenated and fully hydrogenated cottonseed, soybean, palm, palm kernel, coconut, safflower, tallow, cocoa butter, medium chain triglycerides and the like.

Though optional, softeners are preferred. The preferred softeners include unsaturated, partially saturated or fully saturated oils that contain, as one or more of their constituent groups, fatty acids of carbon chain length of from 6 to 18, determined from the fatty acid methyl ester distribution by gas chromatography.

The selection of softeners has an influence on the softness of the base and copolymer. The caproic, caprylic, myristic, lauric and palmitic fatty acids of the triglycerides tend to plasticize the synthetic elastomers more than triglycerides containing predominantly stearic fatty acid. As examples, triglycerides high in saturated lauric fatty acid more effectively plasticize the vinyl laurate/vinyl acetate copolymer, and those high in saturated palmitic fatty acid more effectively plasticize the polyvinyl acetate polymer, increasing the branching.

Monoglycerides, diglycerides, acetylated monoglycerides, distilled mono- and diglycerides and lecithin may, from their manufacturing processing, contain triglyceride levels less than 2 percent by weight. Though these ingredients are softeners, they would not be considered as being of the same family as the above mentioned softeners oils and would be in a family of their own, if optionally used in the present invention.

Fillers used in gum base modify the texture of the gum base and aid in processing. Fillers suitable for use in the gum base and gum of the present invention include carbonate or precipitated carbonated types such as magnesium and calcium carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof.

Particle size has an effect on cohesiveness, density and processing characteristics of the gum base and its compounding. The smaller the particle size, the more dense and cohesive the final gum base. Also, by selecting fillers based on their particle size distribution, initial mass compounding may be varied, thus allowing alteration of the compounding characteristics of the initial mass during gum base processing and ultimately the final chew characteristics of gums made from these gum bases.

Talc filler may be used in the gum base and gum of the present invention that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

Preferably, the optional fillers used in the gum base and gum of the present invention are calcium carbonate, ground limestone, talc, mono-, di- and tricalcium phosphate, zirconium silicate, or mixtures thereof.

More preferably, the optional fillers used have a mean particle size range from about 0.4 to about 14 microns and are calcium carbonate and talc.

Flavorants and colorants impart characteristics or remove or mask undesired characteristics. Colorants may typically include FD&C type lakes, plant extracts, fruit and vegetable extracts and titanium dioxide. Flavorants may typically include cocoa powder, heat-modified amino acids and other vegetable extracts.

Preferably, the optional colorants and flavorants are FD&C lakes and cocoa powder respectively and are present at levels from about 0 percent to about 15 percent by weight.

Gum bases are typically prepared by adding an amount of the elastomer, elastomer plasticizer and filler, and on occasion a vinyl polymer, to a heated (50–240° F.) sigma blade mixer with a front to rear speed ratio of from about 1.2:1 to about 2:1, the higher ratio typically being used for chewing gum base which requires more rigorous compounding of its elastomers.

The initial amounts of ingredients comprising the initial mass may be determined by the working capacity of the mixing kettle in order to attain a proper consistency and by the degree of compounding desired to break down the elastomer and increase chain branching. The higher the level of filler at the start or selection of a filler having a certain particle size distribution, the higher the degree of compounding and thus more of the elastomeric chain cross linking are broken, causing more branching of the elastomer thus lower viscosity bases and thus softer final gum base and gum made from such a base. The longer the time of compounding, the use of lower molecular weight or softening point gum base ingredients, the lower the viscosity and firmness of the final gum base.

Compounding typically begins to be effective once the ingredients have massed together. Anywhere from 15 minutes to 90 minutes may be the length of compounding time.

Preferably, the time of compounding is from 20 minutes to about 60 minutes. The amount of added elastomer plasticizer depends on the level of elastomer and filler present. If too much elastomer plasticizer is added, the initial mass becomes over plasticized and not homogenous.

After the initial ingredients have mass homogeneously and compounded for the time desired, the balance of the base ingredients are added in a sequential manner until a completely homogenous molten mass is attained. Typically, any remainder of elastomer, elastomer plasticizer, vinyl polymer and filler, are added within 60 minutes after the initial compounding time. The filler and the elastomer plasticizer would typically be individually weighed and added in portions during this time. The optional waxes and the oils are typically added after the elastomer and elastomer plasticizers and during the next 60 minutes. Then the mass is allowed to become homogenous before dumping.

Typical base processing times may vary from about one to about three hours, preferably from about 1½ to 2½ hours, depending on the formulation. The final mass temperature when dumped may be between 70° C. and 130° C. and preferably between 100° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

Gum formulas may comprise from about 10 to about 95 weight percent a gum base made in accordance with the present invention in a gum formula typically known to those in the art.

The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent.

Softeners are added to the chewing gum in order to optimize the chewability and mouth feel of the gum. Softeners typically constitute from about 0.5 percent to about 25.0 percent by weight of the chewing gum. Softeners contemplated for use in the gum include glycerin, lecithin and combinations thereof. Further, aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolysates, maltitol and the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitame, thaumatin, aspartame, sucralose, acesulfame, saccharin and dihydrochalcones. The range of these sweetener types in gum typically may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin. A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

The lactic acid based polymers and the poly(lactic acid) homopolymer is semicrystalline and glassy. Also, high molecular weight poly(lactic acid) is difficult to achieve from simple thermal polycondensation. By polymerizing poly(lactic acid) oligomers with other monomers, fortunately, we can achieve both high molecular weights and desired elasticity. There are many approaches in this regard. In the present invention two copolymers based on lactic acid oligomers can be used. One is a poly(lactic acid-dimer fatty acid-oxazoline), and the other a poly(lactic acid-diol-urethane).

The following references disclose the chemistry and process for producing the lactic acid based copolymers of the present invention: Linko, ChemTech, August 1996, p. 26 et seq; and U.S. Pat. Nos. 5,563,238; 5,470,944; and 5,360,892.

Examples of poly(lactic acid-dimer fatty acid-oxazoline) copolymers include, but are not limited to copolymers of lactic acid, C-36 dimeric acid and 1,3-phenylene bis-oxazoline.

Examples of poly(lactic acid-diol-urethane) polymers include, but are not limited to copolymers of lactic acid, 1,4-butanediol and diisocyanate.

The principle of making these copolymers is known in the art and typically involves three steps:

(1). Synthesize poly (lactic acid) oligomers (MW–1,000 g/mol) through thermal polycondensation of lactic acid at about 120° C.;

(2). Prepare either —OH or —COOH terminated poly (lactic acid) oligomers by reacting either diols or dimer fatty acid with the poly (lactic acid) oligomers;

(3)a. Achieve high molecular weight poly (lactic acid-dimer acid-oxazoline) copolymers (PLA-Ox) by reacting carboxyl-terminated LA oligomers with oxazoline, as shown in Scheme 1 below, or (3)b. Achieve high-molecular weight copolymers by reacting the hydroxyl-terminated PLA oligomers with diisocyanate to get poly(lactic acid-diol-urethane) elastomers (PLA-Ur), as shown in Scheme 2 below.

Scheme 1.
Chemical reactions of producing poly(lactic acid-dimer-acid-oxazoline) copolymer.
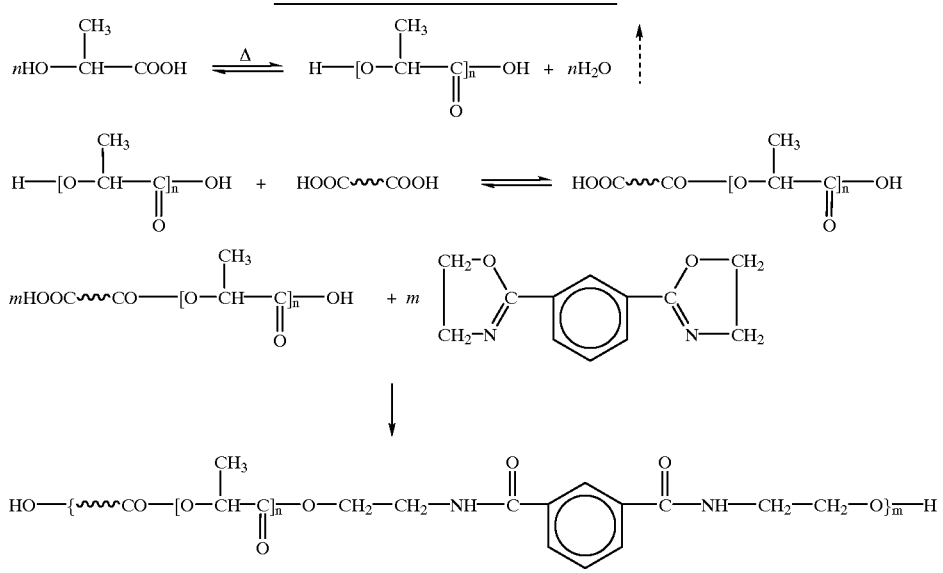
Scheme 2.
Chemical reactions of producing poly(lactic acid-urethane) copolymer.
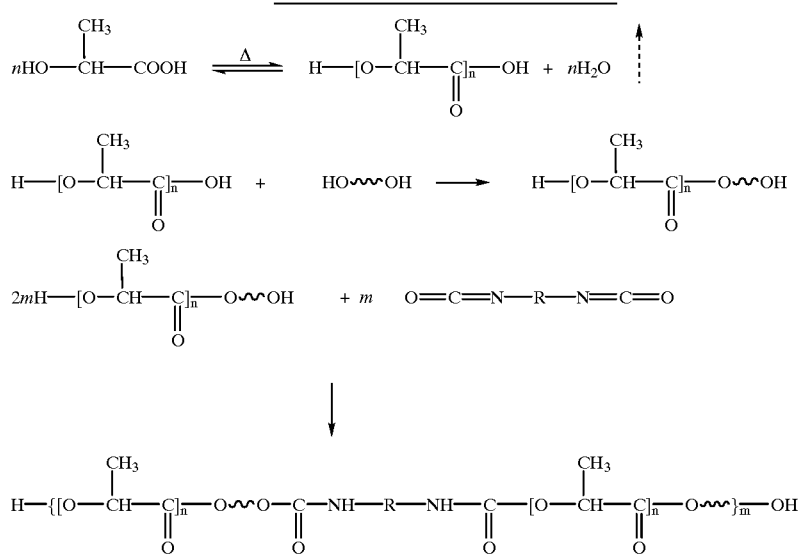
By way of example and not limitation examples of the present invention will now be given:

GENERAL EXAMPLES

|  | Minimum | Maximum | Preferred Minimum | Preferred Maximum |
|---|---|---|---|---|
| CaCO3/Talc | 0 | 65 | 10 | 40 |
| Softeners |  |  |  |  |
| Hyd. Fats | 0 | 40 | 10 | 20 |
| mono-, diglyceride | 0 | 15 | 3 | 10 |
| Capric Triglyceride | 0 | 10 | 1 | 5 |
| Waxes | 0 | 40 | 5 | 15 |
| Elastomer Plasticizers |  |  |  |  |
| Rosin esters | 0 | 35 | 0 | 30 |
| Terpene resins | 0 | 35 | 0 | 30 |
| Poly (lactic acid) |  |  |  |  |
| Elastomers | 3 | 100 | 20 | 70 |

SPECIFIC EXAMPLES

Example 1

To a small gum base mixer (Plastograph from Brabender Corp., Rochelle Park, N.J.) set at 110° C., 50 grams of PLA-Oz was added, then 33 grams of calcium carbonate powder (mean particle=4.5–5.0 micron) was slowly added while mixing breaking the polymer. After 20 minutes of mixing, 12 grams of hydrogenated Soya oil and 5 grams of glycerol monostearate were added.

The PLA-Oz elastomer is a copolymer of lactic acid, Henkel® 1008 dimer fatty acid, and 1,3-phenylene bis-oxazoline. The reaction mechanism is illustrated in scheme 1 above. The elastomer possesses a Tg of −4° C.(DSC). Gel permeation chromatograph (GPC) revealed Mn=12,900 and Mw=36,500 relative to polystyrene standards.

Example 2

The $CaCO_3$ powder in example 1 was replaced with a coarse $CaCO_3$ powder (mean particle=5.0 micron). Also, 1% capric triglyceride replaced 1% hydrogenated soya oil.

Example 3

In example 2, PLA-Oz was reduced to 45 grams, fine $CaCO_3$ powder (mean particle=2.5–3.0 micron) was increased to 35 grams, capric triglyceride was increased to 2 grams, 8 grams of hydrogenated cotton seed oil replaced the hydrogenated soya oil, and 5 grams of paraffin wax (Tm=135° C.) were added.

Example 4

Same as example 3 except that the PLA-Oz is a modified version. The main difference of the elastomer is that one third of the bi-functional dimer acid (Henkel® 1008) was replaced by a tri-functional acid (1,2,3-propane tricarboxylic acid) which provides the final polymers with more branchness. DSC showed a Tg of 13° C. for this polymer. GPC revealed Mn=8,900 and Mw=31,900 relative to polystyrene standards.

Example 5

To a small gum mixer set at 50° C. was adding 19.4 grams of gum base example 2, 59.7 grams of 6x sugar, 19.8 grams of 45Be corn syrup and mix them for 20 min. Then 0.5 g 99% glycerol and 0.6 grams of peppermint flavor was added. Additional 5 minutes of mixing was continued before discharging.

Example 6

In example 4, 1% sugar was replaced with capric triglyceride, and glycerol was increased to 1%.

Example 7

To a small gum mixer set at 50° C. was adding 20.0 grams of gum base example 3, 58.4 grams of 6x sugar powder, and 20 grams of 45 Be corn syrup. After mixing for 20 minutes, 1.0 gram of glycerol and 0.6 grams of peppermint oil were added. Additional 5 minutes mixing was continued. The gum was sheeted and cut to sticks.

Example 8

Gum base example 4 was used.

The rheological property of example 1 is compared with two typical, butyl rubber based gum bases, as shown in FIG. 1; graphically G' $[dyn/cm^2]$ versus Temperature [C°] is illustrated. The tests were run on a Rheometrics RSA-2 rheometer at 10 R/s and 0.5% strain at a heating rate of 28° C./min. As we can see, it is very close in the temperature range between −30° C. and 60° C.

Figure 2:
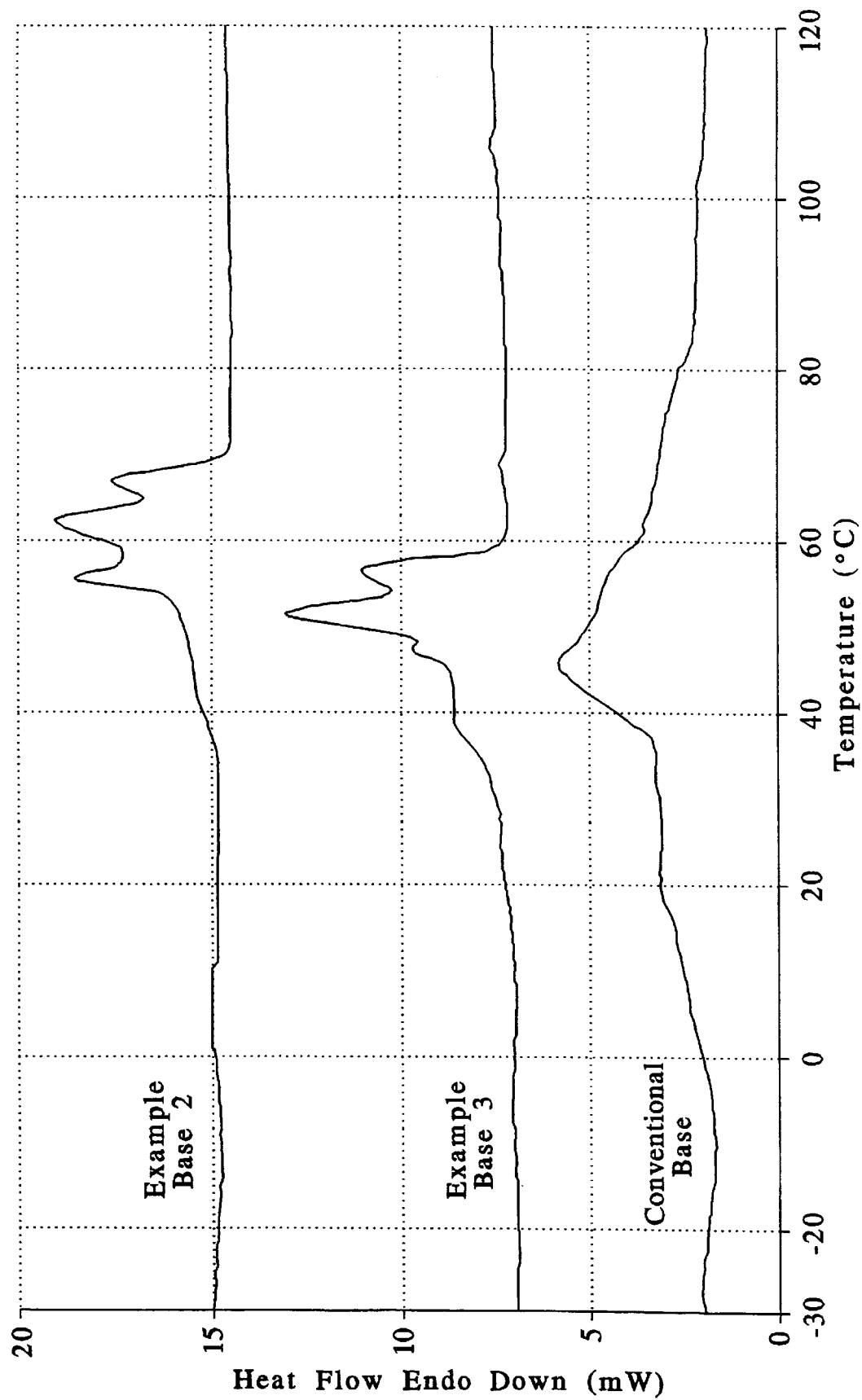
FIG. 2 illustrates graphically a DSC trace comparison of embodiments of compositions of the present invention set forth in Examples 2 and 3 versus a conventional butyl rubber based gum base.

Differential scanning calorimetry (DSC) measurements were carried out on a Perkin Elmer DSC-7 at a heating rate of 15° C./min. FIG. 2 is a comparison of base examples 2 and 3 with a conventional butyl rubber based gum base; graphically heat flow versus temperature (C°) is illustrated. The melting range is very similar as we can see.

Gum cud removability is characterized by a modified peel tester (Instrumentors, Inc., Strongville, Ohio). First, water-soluble ingredients were extracted from a gum stick. Then the gum cud was rolled on a cotton fabric tape to provide a 0.5"×3.0" area. Finally the sample was rolled on a concrete substrate with a 4.5 LB auto roller and peeled at room temperature (20° C.). The peeling angle is 90° and a speed of 12 inch/min was used.

Removability is defined as:

$$R = \frac{1 - C_F}{P_a}$$

where R represents "removability", $P_a$ is the peeling force per inch wide, and $C_F$ is the fraction of residue left on the concrete substrate. The physical meaning of this "gum removability R" is "how many inches (width) of a gum cud can be completely removed with every kilogram applied force".

Table 1 is a comparison of the removability of two environmentally friendly gums versus three conventional gums.

TABLE 1

Removability of Gum Cuds from Concrete Surface at Room Temperature

| Gum | Peel Force (g/inch) | Residue (%) | Removability (inch/kg) |
|---|---|---|---|
| Example 5 | 19 | 0 | 52.63 |
| Example 7 | 27 | 0 | 37.04 |
| Freedent ® | 157 | 0 | 8.98 |

TABLE 1-continued

Removability of Gum Cuds from
Concrete Surface at Room Temperature

| Gum | Peel Force (g/inch) | Residue (%) | Removability (inch/kg) |
|---|---|---|---|
| Spearmint Trident ® | 366 | 0 | 2.72 |
| Original Bazooka ® | 730 | 5 | 1.46 |

As we can see, the experimental gums required much less force to peel from concrete surface and left no visible residues, which is ideal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the attendant claims.

We claim:

1. A chewing gum base comprising:
   approximately 3 to about 99% by weight poly(lactic acid) copolymers selected from the group consisting of poly (lactic acid-dimer fatty acid-oxazoline) copolymers and poly(lactic acid-diol-urethane) copolymers.

2. The chewing gum base of claim 1 wherein the copolymers are selected from the group consisting of lactic acid, dimeric acids, oxazolines, diols, and diisocyanates.

3. The chewing gum base of claim 1 wherein the poly (lactic acid) copolymers comprise approximately 20 to about 70% by weight of the chewing gum base.

4. The chewing gum of claim 1 wherein the poly (lactic acid) copolymers comprise approximately 10 to about 99% by weight lactic acid.

5. The chewing gum of claim 1 including at least one softener chosen from the group consisting of triglycerides of cottonseed oil, soybean oil, palm oil, palm kernel oil, coconut oil, safflower oil, tallow oil, cocoa butter oil, and medium chain triglycerides.

6. The chewing gum base of claim 5 wherein the softener is hydrogenated.

7. The chewing gum base of claim 5 wherein the softener is non-hydrogenated.

8. The chewing gum base of claim 1 including at least one softener chosen from the group consisting of hydrogenated soya oil, glycerol monostearate, capric triglyceride and hydrogenated cotton seed oil.

9. The chewing gum base of claim 1 wherein the base has a melting temperature of approximately 20 to about 80° C.

10. A chewing gum base free of elastomers and vinyl polymers having a molecular weight greater than 2000 comprising:
    at least one poly(lactic acid) selected from the group consisting of poly(lactic acid-dimer fatty acid-oxazoline) copolymers and poly(lactic acid-diol-urethane) copolymers comprising;
    a filler;
    a fat; and
    an emulsifier.

11. The chewing gum base of claim 10 including a wax.

12. The chewing gum base of claim 10 wherein the filler has a particle size of between approximately 3 to about 10 microns.

13. The chewing gum base of claim 10 wherein the copolymers are selected from the group consisting of lactic acid, dimeric acid, oxazolines, diols, and diisocyanates.

14. The chewing gum base of claim 10 wherein the poly(lactic acid) copolymers comprise approximately 20 to about 70% by weight of the chewing gum base.

15. The chewing gum of claim 10 wherein the poly(lactic acid) copolymers comprise approximately 10 to about 99% by weight lactic acid.

16. The chewing gum of claim 10 including at least one softener chosen from the group consisting of triglycerides of cottonseed oil, soybean oil, palm oil, palm kernel oil, coconut oil, safflower oil, tallow oil, cocoa butter oil, and medium chain triglycerides.

17. The chewing gum base of claim 16 wherein the softener is hydrogenated.

18. The chewing gum base of claim 16 wherein the softener is non-hydrogenated.

19. The chewing gum base of claim 10 including at least one softener chosen from the group consisting of hydrogenated soya oil, glycerol monostearate, capric triglyceride, and hydrogenated cotton seed oil.

20. The chewing gum base of claim 10 wherein the base has a melting temperature of approximately 20 to about 80° C.

21. A chewing gum comprising:
    a water soluble portion; and
    a water insoluble base including at least one poly(lactic acid) selected from the group consisting of poly(lactic acid-dimer fatty acid-oxazoline) copolymers and poly (lactic acid-diol-urethane) copolymers.

22. The chewing gum of claim 21 wherein the insoluble base does not include any elastomers or vinyl polymers having a molecular weight greater than 2000.

23. The chewing gum of claim 21 wherein the gum has a removability of greater than 9 in/kg and a peel force of less than 150 g/in.

24. The chewing gum of claim 21 wherein the gum has a removability of greater than 30 in/kg and a peel force of less than 50 g/in.

* * * * *